(12) United States Patent
Leyko (10) Patent No.: US 11,066,990 B2
(45) Date of Patent: Jul. 20, 2021

(54) CONSTANT-VOLUME COMBUSTION MODULE FOR A TURBINE ENGINE, COMPRISING COMMUNICATION-BASED IGNITION

(71) Applicant: SAFRAN, Paris (FR)

(72) Inventor: Matthieu Leyko, Orsay (FR)

(73) Assignee: SAFRAN, Paris (FR)

( * ) Notice: Subject to any disclaimer, the term of this patent is extended or adjusted under 35 U.S.C. 154(b) by 320 days.

(21) Appl. No.: 15/545,287

(22) PCT Filed: Jan. 26, 2016

(86) PCT No.: PCT/FR2016/050151
§ 371 (c)(1),
(2) Date: Jul. 20, 2017

(87) PCT Pub. No.: WO2016/120555
PCT Pub. Date: Aug. 4, 2016

(65) Prior Publication Data
US 2018/0010517 A1    Jan. 11, 2018

(30) Foreign Application Priority Data

Jan. 26, 2015  (FR) ...................................... 1550587

(51) Int. Cl.
| | | |
|---|---|---|
| *F02C 5/12* | (2006.01) | |
| *F23R 7/00* | (2006.01) | |
| *F23R 3/48* | (2006.01) | |
| *F23R 3/26* | (2006.01) | |
| *F23R 3/46* | (2006.01) | |

(Continued)

(52) U.S. Cl.
CPC .................. *F02C 5/12* (2013.01); *F23R 3/26* (2013.01); *F23R 3/46* (2013.01); *F23R 3/48* (2013.01);
(Continued)

(58) Field of Classification Search
CPC ...... F02C 5/12; F23R 7/00; F02K 7/06; F05D 2240/35
(Continued)

(56) References Cited

U.S. PATENT DOCUMENTS

| | | | | |
|---|---|---|---|---|
| 1,129,544 A | * | 2/1915 | Bischof ..................... | F02C 3/02 60/39.45 |
| 2,579,321 A | * | 12/1951 | Guercken ................. | F02C 5/12 60/39.39 |
| 2,928,242 A | * | 3/1960 | Guenther .................. | F02C 5/12 60/39.39 |

(Continued)

OTHER PUBLICATIONS

International Search Report with English language translation, dated Apr. 15, 2016, International Application No. PCT/FR2016/050151 (6 pages).

*Primary Examiner* — Ted Kim
(74) *Attorney, Agent, or Firm* — Womble Bond Dickinson (US) LLP (57) ABSTRACT

The invention relates to a turbine engine combustion module (10), in particular for an aircraft turbine engine, designed to carry out constant-volume combustion, comprising: at least two combustion chambers (12A, 12B) arranged about an axis, each chamber (12A, 12B, 12C) comprising a compressed gas intake port (16) and a burnt gas exhaust port (18); and an ignition means that triggers combustion in the combustion chambers (12A, 12B, 12C). The module (10) comprises at least one duct (80) which establishes a communication between a first combustion chamber (12A) and at least one second combustion chamber (12B) in order to inject burnt gases from the first combustion chamber (12A) into the second combustion chamber (12B) so as to trigger combustion in the second combustion chamber (12B).

7 Claims, 4 Drawing Sheets

(51) Int. Cl.
*F02K 7/06* (2006.01)
*F02C 7/264* (2006.01)

(52) U.S. Cl.
CPC ............... *F23R 7/00* (2013.01); *F02C 7/264* (2013.01); *F02K 7/06* (2013.01); *F05D 2240/35* (2013.01)

(58) Field of Classification Search
USPC .................................... 60/39.37, 247, 39.39
See application file for complete search history.

(56) References Cited

U.S. PATENT DOCUMENTS

| | | | | | |
|---|---|---|---|---|---|
| 2,942,412 | A | * | 6/1960 | Bollay | F02K 7/06 60/247 |
| 5,901,550 | A | * | 5/1999 | Bussing | B01J 3/08 60/39.38 |
| 6,062,018 | A | * | 5/2000 | Bussing | F02C 5/02 60/39.181 |
| 7,448,200 | B2 | * | 11/2008 | Lupkes | F02C 3/16 60/247 |
| 2002/0139106 | A1 | * | 10/2002 | Meholic | F02K 7/06 60/39.39 |
| 2004/0154306 | A1 | * | 8/2004 | Benians | F02C 5/02 60/776 |
| 2004/0216464 | A1 | * | 11/2004 | Lupkes | F02C 5/00 60/776 |
| 2005/0183413 | A1 | * | 8/2005 | Kojima | F02K 7/06 60/247 |
| 2010/0018215 | A1 | * | 1/2010 | Razi | F02C 5/04 60/773 |

\* cited by examiner

CONSTANT-VOLUME COMBUSTION MODULE FOR A TURBINE ENGINE, COMPRISING COMMUNICATION-BASED IGNITION

The invention relates to the field of combustion chambers of aircraft turbine engines, of the type with constant-volume combustion.

The invention applies to any type of turbine engine, in particular to turbojets, turboprops, and unducted-fan turbine engines, also known as "open rotor" engines.

PRIOR ART

A conventional aircraft turbine engine has, in a known manner, one or more than one combustion chamber. A combustion chamber of this kind is supplied with pressurized air by a compressor module and it has a fuel injector that is able to inject fuel into the air flow admitted in order to burn it and thus cause the emission of hot gases that are used firstly to drive a turbine, which drives the compressor module and may also drive a fan of the turbine engine, and secondly for ejection at high speed from the turbine engine in order to propel the aircraft that is fitted with said reaction turbine engine.

In a chamber of this kind, the flow of fuel is continuous and the combustion operates in accordance with a cycle known as a Brayton cycle, that is to say, according to a constant-pressure combustion cycle. However, in order to achieve savings in specific consumption, consideration has been given to replacing the combustion chamber operating in accordance with a Brayton cycle by a plurality of combustion chambers operating in accordance with a Humphrey cycle, that is to say, in accordance with a constant-volume combustion or "CVC" cycle. A combustion chamber of this kind, known in the prior art, is disclosed in, for example, document US-2005/183.413-A1.

The document WO-2014/020275-A1 discloses a CVC combustion chamber with spherical valves having spherical rotors fitted rotatably about axes perpendicular to the axis of the chamber and combined with spherical envelopes of these rotors, said rotors and said envelopes having channels and slots that can be aligned with one another and with inlet/outlet channels of the combustion chamber in order to selectively determine the opening or the closure of the corresponding intake and exhaust valves. Each chamber has a spherical valve at each of its extremities, and said valves are synchronized with one another in order to implement the three successive phases of the Humphrey cycle.

In this solution, the design of the intake and exhaust valves has some disadvantages. Firstly, the movements of the spherical rotors in the envelopes causes several instances of friction, prejudicial to the longevity of such valves. Secondly, the valves are difficult to manufacture, because of the spherical shape of their elements. Thirdly, in this design, the valves remain independent and have to be synchronized, and because of this the complexity of the combustion chamber is not optimal. Fourthly and lastly, each chamber requires an intake valve and an exhaust valve of its own, so that a turbine engine with several chambers has as many intake valves and exhaust valves as chambers.

DESCRIPTION OF THE INVENTION

A combustion chamber operating in accordance with the Humphrey cycle comprises a port for the intake of compressed gas having an intake valve arranged at the inlet to the chamber and an exhaust port for burnt gases having an exhaust valve arranged at the outlet from the combustion chamber. These valves are each capable of oscillating between an open position and a closed position and are controlled in a synchronized manner in order to implement the three successive phases of the Humphrey cycle, namely intake/sweeping—combustion—exhaust gas discharge.

In an engine of this kind, it is desirable for the cycles of the chambers to be staggered in a manner inversely proportional to the number of chambers. By generating a succession of discharge phases, this allows the flow of exhaust gases supplied to the turbine module to be smoothed, and consequently allows the pulsation phenomena inherent in constant-volume combustion cycles to be smoothed. Indeed, if all the chambers were operating simultaneously following the same times of the Humphrey cycle, the exhaust gas discharge phases would all be simultaneous and this would result in an irregular flow of exhaust gases, because it would be subject to the simultaneous pulsation of the gases from the chambers. A flow of this kind would be prejudicial to the longevity of the turbine module. Conversely, a combustion module with chamber cycles that are staggered allows these pulsations to be smoothed. Furthermore, the intake of exhaust gases by the turbine module increases in homogeneity and freedom from pulsations as the number of chambers increases.

Therefore, preferably, a combustion module with a given number of chambers preferably has, between two consecutive chambers, the cycles of its chambers staggered by a fraction of the given number of chambers.

According to the state of the art, combustion in this type of combustion chamber is conventionally triggered in each combustion phase by a spark igniter accommodated in each chamber. A design of this kind, in the context of an engine with more than one chamber, involves a particularly rigorous management of the ignition times, and the fitting, across the whole of the engine, of a complex ignition circuit which can prejudice access to the engine.

It is known from document US-2004/216.464-A1 to arrange, between the outlets of two chambers of this type, connecting ducts allowing a back pressure to be opposed to the exhaust gas discharge in order to promote an increase in the molar density of the mixture and by so doing increase the energy efficiency of each chamber. However, these connecting ducts are used only for that purpose.

It is also known from document US-2004/154.306-A1 to arrange, between the inlets of two chambers of this type, connecting ducts allowing the transfer from a first chamber to a second chamber of burnt combustion gases or "compounding" gases, intended to increase the rate of compression in the second chamber prior to the injection of fuel into this chamber. However, these connecting ducts are used only for the purpose of improving the efficiency of the combustion and do not play a part in the ignition of the combustible mixture.

However, one solution to trigger ignition in a constant-volume chamber in the absence of a spark igniter is to inject hot burnt gases into it, the high temperature of these gases being sufficient to trigger combustion.

The invention proposes a combustion module that implements this solution to trigger ignition successively in the combustion chambers.

With this aim, the invention proposes a combustion module of the type that is configured to implement constant-volume combustion, having at least two combustion chambers, each chamber comprising an intake port for compressed gas and an exhaust port for burnt gas, and an ignition means that triggers combustion in the combustion chambers. The module has its chambers arranged about an axis, and it has at least one duct that can put a first combustion chamber into communication with at least one second combustion chamber in order to inject burnt gases from the first combustion chamber into said second combustion chamber so as to trigger combustion in said second combustion chamber. The chambers are fitted, for example, in a radiating manner around an axis.

According to other features of the combustion module:

the module has an obturator for opening/closing the duct able to selectively allow burnt gases to pass from the first combustion chamber to said second combustion chamber;

the duct is a fixed duct and the obturator has at least one preset pressure valve means, which is situated in the duct, and which is able to open as soon as the pressure of the burnt gases in the first chamber exceeds a predetermined threshold;

the module has at least one group of combustion chambers arranged angularly in a regular manner around said axis, said group having at least one ignition circuit of its own that has communication ducts which are each arranged between two chambers of said group and which can inject burnt gases from a first of the two chambers into the second of the two chambers in order to trigger combustion in said second combustion chamber;

the module has at least two groups of combustion chambers arranged angularly in a regular manner around said axis, each group having at least one ignition circuit of its own that has communication ducts which are each arranged between two chambers of said group and which can inject burnt gases from a first of the two chambers into the second of the two chambers so as to trigger combustion in said second combustion chamber of said group, and at least one supplementary ignition circuit, which is interposed between two groups and which has supplementary communication ducts that are each arranged between a first chamber of one group and a second chamber of the other group and which can inject burnt gases from the first chamber of the first group into the second chamber of the second group so as to trigger combustion in said second combustion chamber of said second group, in order to maintain the ignition of the chambers of both groups in the event of a failure of one group's own ignition circuit;

the intake/exhaust ports of the combustion chambers are configured so that they are opened or closed by common respective intake/exhaust valves that are synchronized and fitted rotatably around said axis, said valves having a radial opening that is formed in a wall shaped as a cylinder portion of the combustion chamber turned towards the axis, each corresponding rotary intake or exhaust valve having a tubular element, of a diameter corresponding to said cylinder portion fitted rotatably coaxially with said cylinder portion, said tubular element having a bore allowing the intake/exhaust gases to be routed, and at least one radial slot, arranged substantially in an axial plane of the radial opening of said port, and which is able to obturate or free said radial opening during the rotation of said tubular element and at least one of the rotary valves has on its periphery a throat portion that extends over a predetermined angular sector of the periphery of the rotary valve in order to determine an escape duct that is intended to put into communication a first of the combustion chambers and a second of the combustion chambers adjacent to said first chamber, in a position of said rotary valve corresponding to an end of combustion in the first chamber prior to a discharge of the burnt gases and an end of filling of the second chamber prior to combustion, the rotary valve forming the obturator depending on its angular position;

the throat portion is formed in the periphery of the tubular element of the rotary exhaust valve;

the module has a common rotary element that has the rotary intake/exhaust valves connected to one another in rotation.

The invention also relates to a turbine engine having a compressor module with at least one compressor, a combustion module of the type described above, and a turbine module with at least one turbine, the compressor module being connected to the turbine module by a system of shafts. According to the invention, this turbine engine is characterized in that the compressor module supplies the combustion module by means of a single intake duct, and in that the combustion module supplies the turbine module by means of a single exhaust duct.

According to another feature of the turbine engine, at least one shaft of the system of shafts forms the means for driving the common rotary element connecting the rotary intake and exhaust valves to one another in rotation.

Lastly, the invention relates to a method for controlling a turbine engine combustion module of the type described above, having at least one step of successive ignition of at least one first and one second combustion chamber each of which operates successively in accordance with a cycle having:

a first phase during which the intake and exhaust ports are closed, with a first sub-phase of containment of a fresh combustible mixture then a second sub-phase of combustion of said combustible mixture in each corresponding chamber;

a second phase during which the intake port is closed and the exhaust port is open, to cause the burnt gases to be discharged from each corresponding chamber; then a third phase during which the intake and exhaust ports are open, to cause the burnt gases to be swept by with fresh gases through each corresponding chamber;

wherein, during the step of successive ignition, the intake and exhaust gas discharge of the first chamber and the second chamber are dephased so that the first chamber can be subjected to the second sub-phase while the second chamber is subjected to the first sub-phase, and in that the step of successive ignition has a sub-step of control, taking place when the first chamber is subjected to the second sub-phase, during which the first chamber and the second chamber are put into communication in order to trigger combustion in the second chamber.

The invention will be better understood and other details, features and advantages of the present invention will become more clearly apparent on reading the description that follows, given as a non-restrictive example and with reference to the accompanying drawings, in which:

In the description that will follow, identical reference numbers designate parts that are identical or have similar functions.

Figures 1, 2, 3, 4, 5:
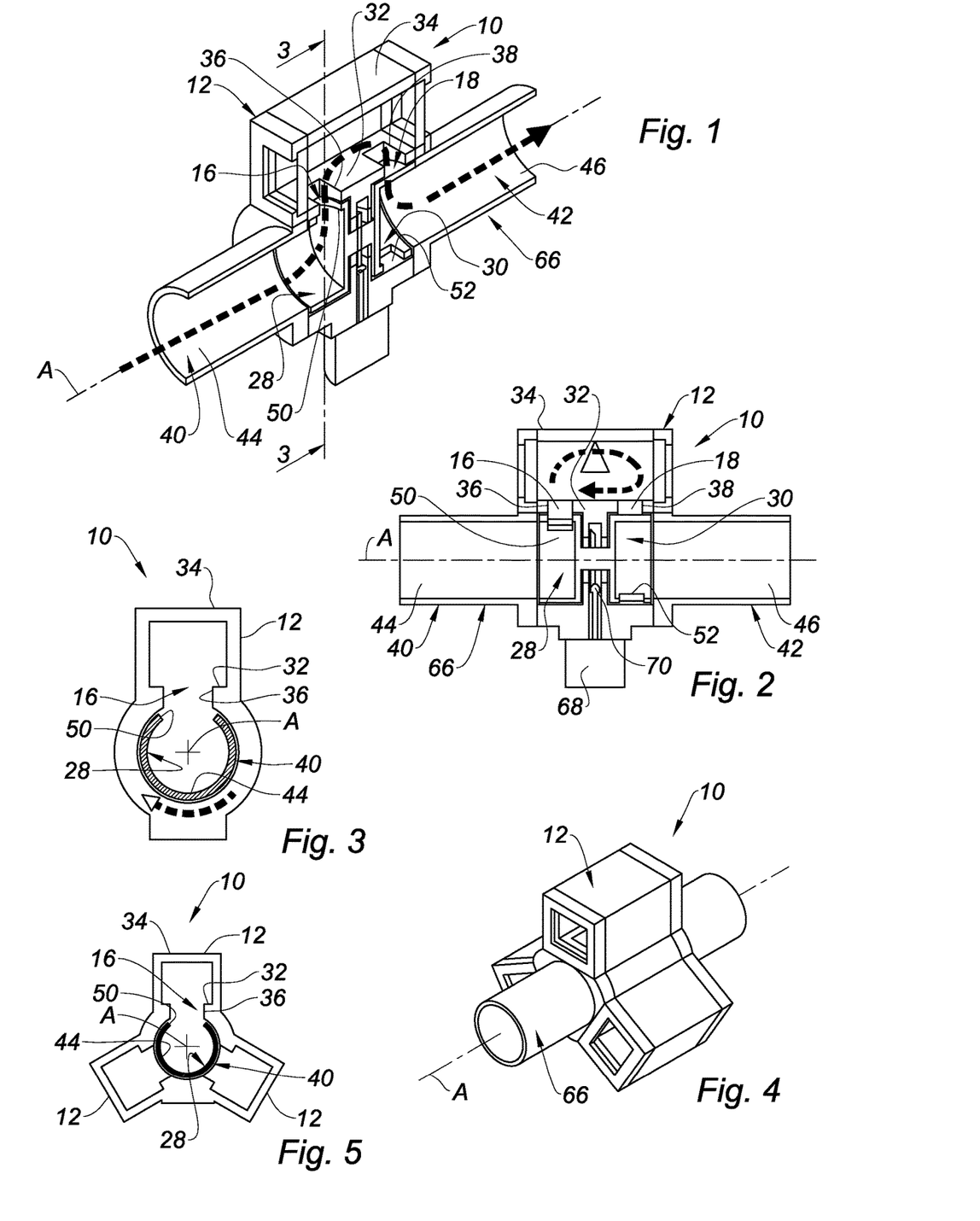
FIG. 1 is a view in perspective cut through an axial plane illustrating the principle of a constant-volume combustion module.
FIG. 2 is a diagrammatic view in axial cross section of the combustion module of FIG. 1.
FIG. 3 is a diagrammatic view in transverse cross section of the combustion module of FIG. 2.
FIG. 4 is a perspective view of a combustion module with three combustion chambers.
FIG. 5 is a diagrammatic view in transverse cross section of the combustion module of FIG. 4.

FIGS. 1 to 3 illustrate the principle of a combustion module 10 configured to implement constant-volume combustion taking place in accordance with the Humphrey cycle, that is to say, with a combustion phase, an exhaust gas discharge phase, and a phase for the intake of fresh air and sweeping out of the burnt gases. FIGS. 1 to 3 illustrate the principle of a combustion module 10 having a combustion chamber 12 arranged around an axis A, which corresponds, for example, to an axis of rotation of a turbine engine. FIGS. 1 to 3 have been simplified to a single chamber 12, to give an understanding of the operation of such a chamber 12. However, the invention relates to a module with at least two combustion chambers 12, that is to say, for example, a module of the type represented in FIGS. 4 and 5, which has three combustion chambers.

Figure 6:
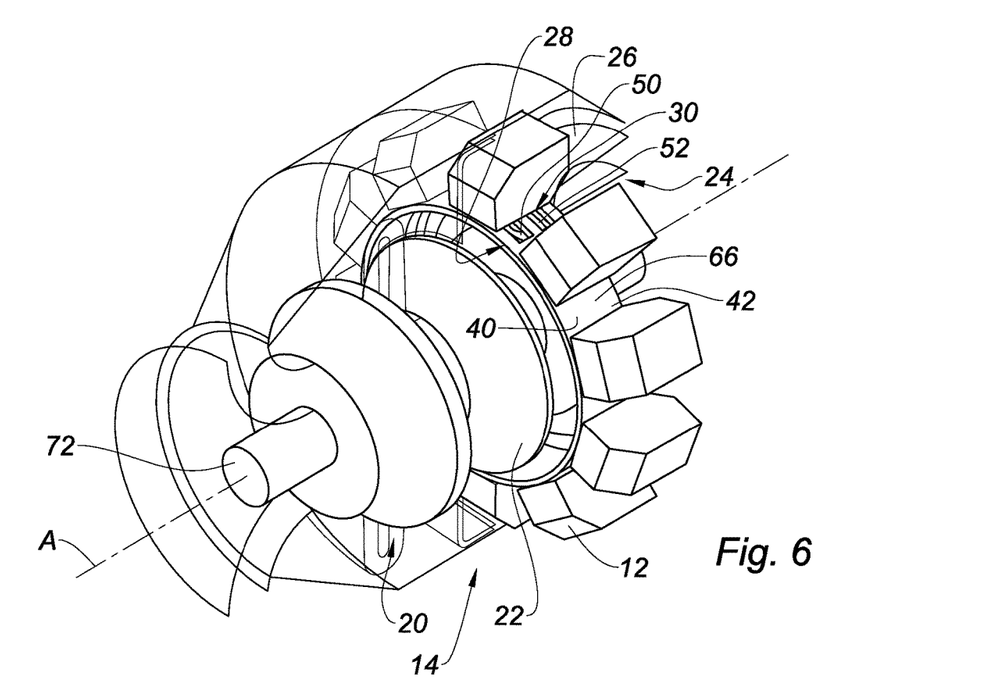
FIG. 6 is a perspective view, with cutaway, of a turbine engine with a plurality of constant-volume combustion modules.

The combustion module 10 may have a greater number of chambers 12, as illustrated in FIG. 6, which shows a turbine engine 14 having ten combustion chambers 12 arranged around the axis A.

As FIGS. 1 and 2 illustrate, each chamber 12 comprises an intake port 16 for compressed gas and an exhaust port 18 for burnt gases. In a turbine engine of the type shown in FIG. 6, the compressed gas intake port 16 is supplied by a compressor module 20 of the turbine engine 14 comprising at least one compressor 22, and the gas exhaust port 18 supplies at least one turbine module 24 comprising at least one turbine 26.

The invention is described with reference to preferred embodiments of the combustion module 10, but it will be understood that this configuration is not restrictive of the invention.

Preferably, each intake port 16 or exhaust port 18 is configured to be opened or closed by a rotary intake valve 28 or by a corresponding exhaust valve 30, coaxial with the axis A of the turbine engine 14. The direction of rotation of the rotating intake valve 28 is shown by a dotted arrow in FIG. 3.

The combustion module 10 shown in FIGS. 1 to 3 has only one combustion chamber 12. In this configuration, the ignition of the combustion chamber 12 is necessarily affected by an ignition means, for example a spark igniter, which is specifically associated with the chamber 12.

With the aim of homogenizing the exhaust gases supplied to the turbine module 24 of the turbine engine, a module 10 is proposed that has more than one combustion chamber 12. Therefore, it is preferable to have a module 10 with at least two combustion chambers 12 distributed angularly in a regular manner around the axis A, the intake ports 16 of which are configured to be opened or closed by a common rotary intake valve 28 and the exhaust ports 18 of which are configured to be opened or closed by a common rotary exhaust valve 30. The intake valve 28 and the exhaust valve 30 may rotate together or may be parts able to rotate differently.

FIG. 5 illustrates a combustion module 10 of this type, having a common rotary intake valve 28 that supplies the three intake ports 16 of three combustion chambers 12 of a single module 10.

Similarly, FIG. 6 shows a turbine engine the module 10 of which has a common rotary intake valve 28 that supplies the intake ports of ten combustion chambers 12 of a single module 10 and a rotary exhaust valve 30 that is supplied by the ten exhaust ports of the ten combustion chambers 12 of said module 10.

This configuration is particularly advantageous, because it allows more than one chamber 12 to be supplied using a single intake valve 28 and allows the gases to be evacuated therefrom using a single exhaust valve 30, which allows the architecture of a turbine engine 14 with a combustion module 10 of this kind to be simplified considerably in relation to the designs previously known from the prior art.

The combustion chambers 12 are distributed angularly in a regular manner around the axis A, and each of them has a direction oriented preferably in a substantially axial direction parallel to the axis A, so as to form a barrel-shaped structure. However, this configuration is not restrictive, and the chambers could be arranged according to another orientation as long as they are disposed in a radiating manner around the axis A so that they can be supplied with compressed air in a common manner through a common intake valve 28 and so that the burnt gases can be discharged in a common manner through a common exhaust valve 30.

Also preferably, the combustion cycles of the chambers 12 are staggered in accordance with a staggering that depends on the number of chambers 12. This allows the flow of exhaust gases supplied to the turbine module 24 to be smoothed, while smoothing the pulsation phenomena inherent in constant-volume combustion cycles. Indeed, if all the chambers 12 were to operate simultaneously following the same times of the Humphrey cycle, the exhaust phases would all be simultaneous and the result of this would be an irregular flow of exhaust gases, because it would be subject to the simultaneous pulsation of the gases coming from the chambers 12. A flow of this kind would risk damaging the turbine module 24. Conversely, a combustion module 10 operating in accordance with staggered chamber cycles 12 allows these pulsations to be smoothed. It will be noted that the intake of exhaust gases by the turbine module 24 increases in homogeneity and freedom from pulsations as the number of chambers 12 increases.

Thus, preferably, a combustion module with a predetermined number n of chambers 12 will have the cycles of its chambers staggered. For a number of chambers n, a number of chambers that is less than half (n/2) the number of chambers n will be caused to operate at the same time in order to balance the loads on the rotary valves. In particular, two opposed chambers will be on the same cycle phase, for example, for four chambers at a given moment, there will be combustion in two chambers and no combustion in two chambers.

In the embodiment under consideration, the rotary intake 28 and exhaust 30 valves are synchronized in rotation with one another, rotating at the same speed. This synchronisation can generally be produced by any means known in the prior art, in particular mechanically.

The multiplication of the number of combustion chambers 12 raises the problem of the ignition means intended to cause combustion in these chambers 12.

In an architecture of this kind with more than one chamber 12, it is of course possible to reproduce the configuration shown in FIG. 1, according to which each chamber 12 has an independent ignition means. However, this configuration is not very suitable because it requires synchronized management of the ignition times. Furthermore, in this configuration the complexity of the combustion module 10 increases as its number of chambers 12 increases.

However, it is possible to cause a combustible mixture in a combustion chamber to ignite not by means of a spark igniter, but by injections of hot gases, such as, for example, gases at a temperature close to combustion temperature.

Therefore, as FIGS. 6 to 15B show, the invention proposes a combustion module 10 of the type described above, having at least one duct 80 that can put a first combustion chamber 12A into communication with at least one second combustion chamber 12B in order to inject burnt gases from the first combustion chamber 12A into said second combustion chamber 12B so as to trigger combustion in said second combustion chamber 12B.

Thus, it will be understood that the combustion module 10 according to the invention has at least one duct 80 that can put into communication two combustion chambers 12A, 12B the combustion cycles of which are staggered. To that end, the set of steps of intake/sweeping—combustion—exhaust gas discharge of the chambers 12A, 12B are staggered. This staggering entails not only the injection of burnt gases from the first combustion chamber 12A into said second combustion chamber 12B in order to trigger combustion in said second combustion chamber 12B, but also the staggering of the intake of gases into and discharge of gases from the two chambers 12A, 12B, through the intake 28 and exhaust 30 valves, so that burnt gases from the first chamber 12A are injected into the chamber 12B full of fresh combustible mixture. The direction of rotation of the rotating intake valve 28 is shown by a dotted arrow in FIG. 13A.

Furthermore, more generally, this configuration is applied to all the combustion chambers of the combustion module 10, the injections of burnt gases being performed from one chamber to a successive chamber in the ignition sequence of the chambers.

In the following part of the description of the present invention, a description will be given of the operation of a combustion module 10 having at least one group of three chambers 12A, 12B, and 12C intended to form the subject of successive combustions, it being understood that the combustion module 10 may have a greater number of chambers 12.

In accordance with the invention, the module 10 has an obturator 30, 82 which constitutes a means for opening/closing the duct 80 capable of selectively allowing burnt gases to pass from the first combustion chamber 12A to said second combustion chamber 12B.

Figure 7:
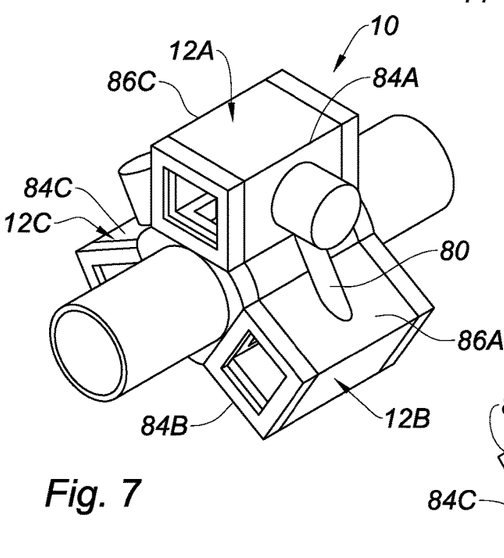
FIG. 7 is a perspective view of a combustion module with three combustion chambers according to the invention.

According to a first embodiment of the invention that is shown in FIGS. 6 and 7, each duct 80 is a fixed duct which connects a wall 84A, 84B, 84C to a wall 86A, 86B, 86C of two successive chambers among the chambers 12A, 12B, 12C and which is capable of being opened or closed by an obturator 82.

The obturator 82 constituting the means for opening each duct 80 may take any form known in the prior art. For example, the obturator 82 may have a solenoid valve. However, in the interests of simplification, the obturator 82 has at least one preset pressure valve means 84, which is situated in the duct 80, and which is able to open as soon as the pressure of the burnt gases in the first chamber 12A, 12B, 12C exceeds a predetermined threshold. As soon as this threshold is passed, the valve means 84 opens, and allows the next chamber to be supplied. Thus, the chamber 12A supplies burnt gases to the chamber 12B, which then supplies burnt gases to the chamber 12C, which then supplies burnt gases to the chamber 12A, and then the cycle repeats itself.

This configuration is particularly suited to a module 10 having at least one group of combustion chambers 12A, 12B, 12C arranged angularly in a regular manner around the axis A, the ignition sequence being capable of being repeated cyclically. Each group of chambers 12A, 12B, 12C has at least one ignition circuit of its own 90, consisting of the ducts 80 and the obturators 82, said communication ducts 80 each being arranged between two chambers of the same group of chambers 12A, 12B, 12C.

Figure 8:
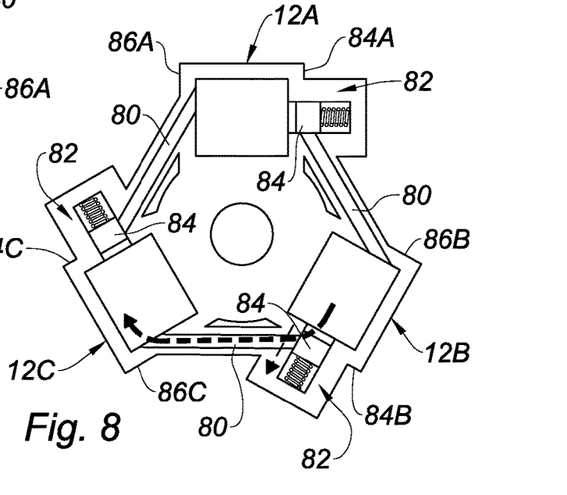
FIG. 8 is a diagrammatic view in transverse cross section of the combustion module of FIG. 6.
Figure 9:
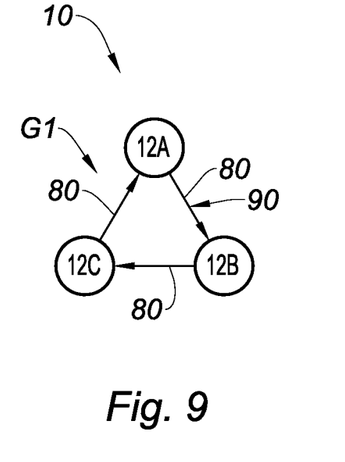
FIG. 9 is a diagrammatic view of an ignition circuit of the combustion module of FIGS. 7 and 8.

FIG. 8 and FIG. 9 illustrate diagrammatically the simplest of the configurations of this type of ignition system.

In this configuration, the module 10 has a single group G1 of combustion chambers 12A, 12B, 12C arranged around the axis angularly in a regular manner, which has its own ignition circuit 90 that has its communication ducts 80 which are each arranged between the successive chambers 12A, 12B, 12C of said group in the direction of ignition shown by the arrows in FIG. 8. The ducts 80 are able to inject burnt gases from a first of the two chambers 12A, 12B, 12C into the second of the two successive chambers 12B, 12C, 12A, in order to trigger combustion in said second combustion chamber 12B, 12C, 12A.

This configuration assumes, in order to operate correctly in a continuous manner, that combustion is initiated correctly in each chamber 12A, 12B, 12C by an injection of burnt gases coming from the preceding chamber 12C, 12A, 12B in the ignition sequence. However, if combustion is not triggered, the cycle is then interrupted and has to be restarted by a conventional ignition means such as a spark igniter.

Figure 10:
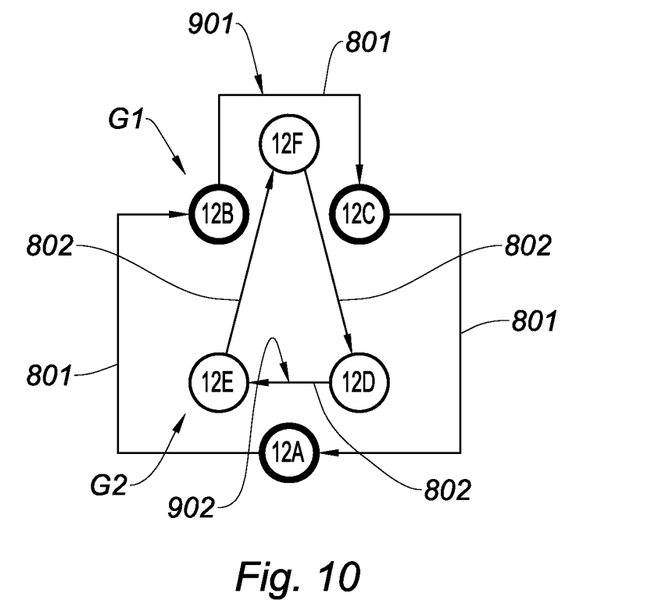
FIG. 10 is a diagrammatic view of a first variant of an ignition circuit for the combustion module of FIGS. 7 and 8.

FIG. 10 illustrates a first variant of this configuration according to which the module has two groups G1 and G2 of combustion chambers 12A, 12B, 12C and 12D, 12E, 12F respectively arranged angularly in a regular manner around the axis A, each group G1 and G2 having at least one ignition circuit of its own 901 and 902 respectively that has communication ducts 801 and 802 which are each arranged between two chambers of said group G1 and G2 and which can inject burnt gases from a first of the two chambers in the same group G1 or G2 into the second of the two chambers in the same group G1 or G2.

In this way, if flame extinction occurs in one of the groups G1 or G2, the other group continues to operate, which prevents the stoppage, or at least allows operation in fail-safe mode, of the associated turbine engine. It is possible to provide a conventional ignition means such as a spark igniter on one of the chambers in each group G1 or G2, so that one group G1 or G2 can be restarted in the event of flame extinction.

In FIG. 10, the combustion module 10 illustrated has two groups G1 and G2, but it will be understood that the combustion module 10 may have a greater number of groups.

It will be noted that the groups of chambers 12A, 12B, 12C and 12D, 12E, 12F may be staggered in an angular manner, as shown diagrammatically in FIG. 9, but it will be understood that they may also be staggered axially along the axis A.

Figure 11:
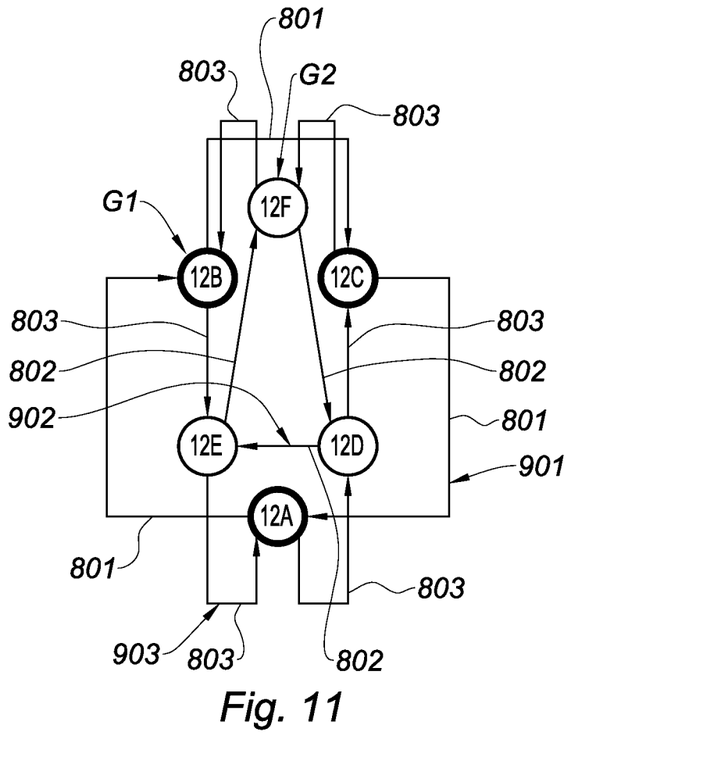
FIG. 11 is a diagrammatic view of a second variant of an ignition circuit for the combustion module of FIGS. 7 and 8.

FIG. 11 illustrates a second variant of the combustion module 10 according to which the module 10 has, like the previous instance, two groups G1 and G2 of combustion chambers 12A, 12B, 12C and 12D, 12E, 12F respectively, arranged angularly in a regular manner around the axis A, each group G1 and G2 having at least one ignition circuit of its own 901 and 902 respectively that has communication ducts 801 and 802 which are each arranged between two chambers of said group G1 and G2 and which are able to inject burnt gases from a first of the two chambers of the same group G1 or G2 into the second of the two chambers of the same group G1 or G2. The module 10 has at least one supplementary ignition circuit 903, which is interposed between two groups G1 and G2 and which has supplementary communication ducts 803 which are each arranged between a first chamber 12A, 12B, 12C of a group G1 and a second chamber 12D, 12E, 12F of the other group G2 and which are able to inject burnt gases from the first chamber 12A, 12B, 12C of the first group G1 into the second chamber 12D, 12E, 12F of the second group G2 in order to trigger combustion in said second combustion chamber 12D, 12E, 12F of said second group G2, so as to maintain the ignition of the chambers of both groups G1 and G2 in the event of failure of a group's own ignition circuit.

It will be understood that, preferably, this configuration is reciprocal, and that each chamber may allow two chambers to be ignited and can be ignited by two other chambers. Thus, each chamber 12A, 12B, 12C ignites one chamber 12B, 12C, 12A of the same group G1 and one chamber 12D, 12E, 12F of the other group G2 while reciprocally each chamber 12D, 12E, 12F ignites one chamber 12E, 12F, 12D of the same group G2 and one chamber 12A, 12B, 12C of the other group G2.

In this configuration, the risks of flame extinction are reduced. The probability of total flame extinction in a combustion module with N groups is $p^N$, where p is the probability of flame extinction in one chamber.

According to a second embodiment of the invention shown in FIGS. 12 to 15B, it is possible to take advantage of a particular configuration of the intake 28 and exhaust 30 valves in order to obtain the duct 80.

FIG. 1 illustrates the principle of a combustion module 10 with intake 28 and exhaust 30 valves of this kind.

Preferably for the invention, each combustion chamber 12 has at least one wall 32, 34 in the form of a cylinder portion turned towards the axis A. The chambers 12 have at least one first longitudinal wall 32 in the form of a cylinder portion, turned towards the axis A, that is to say an inner wall 32, which has the two ports for intake 16 and exhaust 18, and also a second longitudinal wall 34, turned opposite the axis A, that is to say an outer wall 34, which is devoid of intake or exhaust ports.

Each port 16, 18 has a radial opening 36, 38 that is made in the cylinder-portion-shaped inner wall 32 of the combustion chamber coaxial with the axis A. Each rotary intake valve 28/exhaust valve 30 has a corresponding tubular element 40, 42, of a diameter corresponding to said cylinder portion, and fitted rotatably internally to said cylinder portion. This tubular element 40, 42 constitutes, opposite the combustion chamber 12, a gas intake/exhaust duct 44, 46 formed in an inner bore of the tubular element 40, 42, and it has at least one radial slot 50, 52, arranged substantially in an axial plane of the radial opening 36, 38 of said port 16, 18, that is able to obturate or free said radial opening 36, 38 during rotation of said tubular element 40, 42.

The routing of the intake gases and the discharge of the exhaust gases are shown by the arrow in FIG. 1.

The tubular elements 40, 42 are synchronized in rotation in a very simple manner. Advantageously, the combustion module 10 has a common rotary element 66 which has rotary intake 28 and exhaust 30 valves and which is moved by, for example, a single drive means. This configuration therefore allows the intake 28 and exhaust 30 valves to be synchronized very simply. Separate drive means may be provided, for example means that are synchronized with one another.

This rotary element 66 can be driven in different ways. For example, the rotary element 66 can be driven by a motor 68, and by an angle gear connection 70, as shown in FIG. 2, but more simply, the rotary element 66 can be connected to a shaft system of the associated turbine engine by means of an appropriate reduction gear. A shaft system 72 of this kind, connecting the compressor module 20 to the turbine module 24, is shown as an example in FIG. 6.

It will be noted that this configuration allows a simplified supply of intake gas to the combustion module 10 and a simplified discharge of the gases burned in said combustion module 10. The compressor module 22 supplies intake gases to the combustion module 10 by means of a single intake duct leading into the bore 44 of the rotary element 66 and the combustion module 10 supplies the turbine module 24 with exhaust gases by means of a single exhaust duct supplied by the bore 46 of the rotary element 66.

On this basis, the invention proposes, in this second embodiment, to create the duct directly in the rotary element 66.

To that end, at least one of the rotary valves 28, 30 has on its periphery a throat portion 92 that extends over a predetermined angular sector of the periphery of the rotary valve 28, 30 in order to determine an escape duct that is intended to put into communication a first of the combustion chambers 12A and a second of the combustion chambers 12B adjacent to said first chamber, in a position of said rotary valve corresponding to an end of combustion in the first chamber 12A prior to a discharge of the burnt gases and an end of filling of the second chamber 12B prior to combustion.

Figure 12:
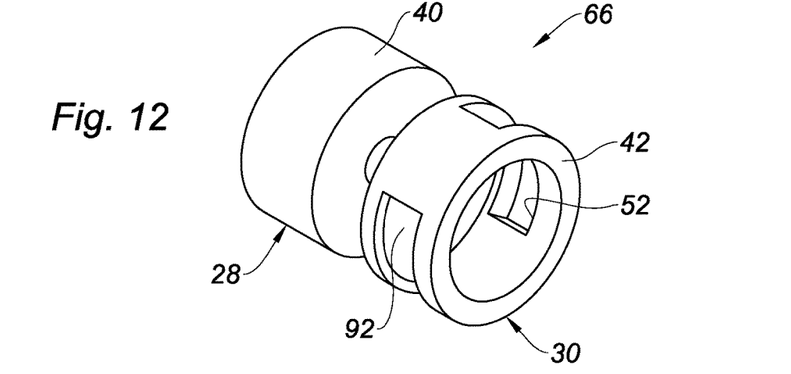
FIG. 12 is a perspective view of a rotary element for an ignition circuit of a combustion module according to FIGS. 4 to 6.

FIG. 12 therefore shows the throat portion 92 that has been formed over an angular sector of the exhaust valve 30, said angular sector being arranged at the periphery of the tubular element 42 in the same axial plane as the exhaust slot 52.

In this instance, it is therefore the valve 30 of the rotary element 66 that itself forms the obturator depending on its angular position relative to the chambers 12A, 12B, 12C.

It will be understood that this arrangement is not restrictive of the invention and that the throat portion 92 may be formed in the periphery of the tubular element 40 of the intake valve 28.

The throat portion 92 has an angular aperture greater than the distance between the radial openings 38 of the two chambers 12A, 12B. For example, in FIGS. 13A to 15B, the angular distance between two successive chambers 12A, 12B is 60°, and it will be understood that the throat portion has an aperture greater than 60°.

The throat portion 92 may be partially covered to protect the cavity in which the rotary element 66 is housed. This makes it possible, for example, to avoid degrading the sealing system of the rotary element 66, consisting, for example, of abradable materials, during the circulation of the hot gas in the throat 92.

In this way, the throat portion 92 constitutes some of the walls delimiting the duct 80 between the two chambers 12A, 12B only in certain angular positions of the rotary element 66.

As FIGS. 13A to 15B show, each combustion chamber 12A, 12B, 12C operates in accordance with a cycle that has a first phase during which the intake port 16 and the exhaust port 18 are closed. This first phase has a first sub-phase of containment of a fresh combustible mixture then a second sub-phase of combustion of said combustible mixture. Next, the cycle has a second phase during which the intake port 16 is closed and the exhaust port 18 is open, to cause the discharge of the burnt gases. Then the cycle has a third phase during which the intake port 16 and the exhaust port 18 are open, in order to sweep the burnt gases with fresh gases.

The relative angular position of the radial slots 50, 52 of the element determines the execution of the process according to which the intake and the discharge of the first chamber 12A and the second chamber 12B, and of the subsequent chambers in the ignition sequence, are dephased so that the first chamber 12A can be subjected to the second sub-phase when the second chamber 12B is subjected to the first sub-phase.

Furthermore, the angular position of the throat portion 92 determines a sub-step of control, taking place when the first chamber is subjected to the second sub-phase, during which the first chamber 12A and the second chamber 12B are put into communication in order to trigger combustion in the second chamber 12B. In this instance the throat portion 92 determines, in this angular position of the tubular element 42, an escape duct 80 between the chambers 12A and 12B, which allows a portion of the burnt gases to be routed from the chamber 12A to the chamber 12B in order to trigger combustion in the chamber 12B.

Figure 13A:
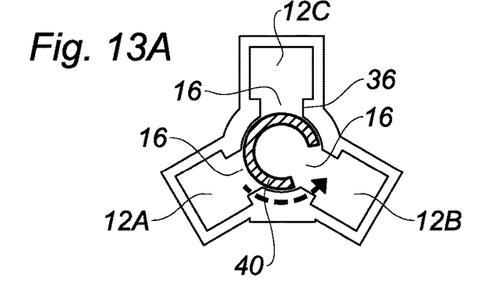
FIGS. 13A, 14A and 15A are diagrammatic views representing three successive positions of a combustion module with a rotary element according to FIG. 11, in transverse cross section in the axial plane of its intake valve.
Figure 13B:
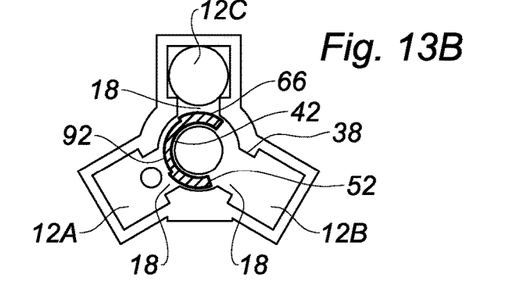
FIGS. 13B, 14B and 15B are diagrammatic views representing three successive positions of a combustion module with a rotary element according to FIG. 11, in cross section in the axial plane of its exhaust valve.

In the position in FIGS. 13A and 13B, the chamber 12C is at the end of the second sub-phase of combustion, the chamber 12A is at the start of the second sub-phase of combustion, and the chamber 12B is in the third phase of sweeping out the burnt gases.

Figure 14A:
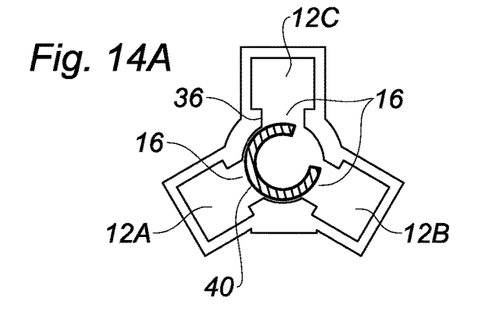
Figure 14B:
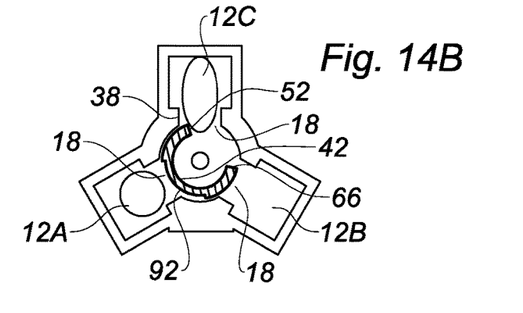

In the position in FIGS. 14A and 14B, the chamber 12C is in the second phase of discharge, the chamber 12A is in the second sub-phase of combustion, and the chamber 12B is at the end of the third phase of sweeping out the burnt gases.

Figure 15A:
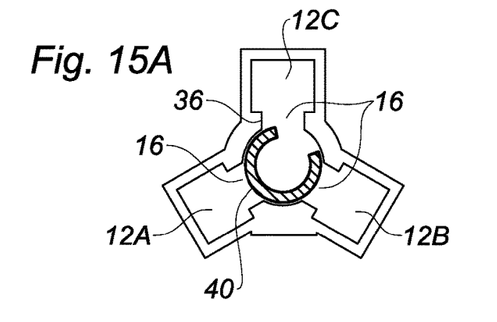
Figure 15B:
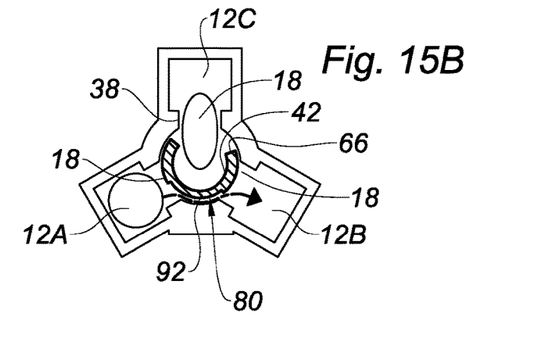

In the position in FIGS. 15A and 15B, the chamber 12C is in the third phase of sweeping out the burnt gases, the chamber 12A is at the end of the second sub-phase of combustion, and the chamber 12B is in the first sub-phase of combustion. In this position, the throat portion 92 delimits an escape duct 80 between the chamber 12A and the chamber 12B. The burning gases move along in the escape duct 80 and allow the mixture in the chamber 12B to be set on fire.

The invention therefore allows the ignition of the chambers 12 of a constant-volume type of combustion module 10 with radiating combustion chambers to be controlled in a simple and reliable manner.

The invention claimed is:

1. A combustion module of a turbine engine, configured to implement constant-volume combustion, having at least two combustion chambers, each chamber comprising an intake port for compressed gas and an exhaust port for burnt gas, said intake ports and exhaust ports of the at least two combustion chambers being opened or closed by common respective intake/exhaust valves and an ignition means that triggers combustion in the combustion chamber, the chambers being arranged around an axis, the module having at least one duct that can put a first combustion chamber into communication with at least one second combustion chamber in order to inject burnt gases from the first combustion chamber into said at least one second combustion chamber so as to trigger combustion in said at least one second combustion chamber, wherein the combustion module has an obturator for opening/closing the at least one duct capable of selectively allowing burnt gases to pass from the first combustion chamber to said second combustion chamber, wherein the intake/exhaust ports of the combustion chambers are configured so that the intake/exhaust ports are opened or closed by common respective intake/exhaust valves that are synchronised and fitted rotatably around said axis, said valves cooperating with a radial opening that is formed in a wall shaped as a cylinder portion of the combustion chamber turned towards the axis, each corresponding rotary intake or exhaust valve having a tubular element, of a diameter corresponding to said cylinder portion fitted rotatably coaxially with said cylinder portion, said tubular element having a bore allowing the intake/exhaust gases to be routed, and at least one radial slot, arranged substantially in an axial plane of the radial opening of said port, and which is able to obturate or free said radial opening during the rotation of said tubular element and in that at least one of the rotary valves has on a periphery of said at least one of the rotary valves a throat portion that extends over a predetermined angular sector of the periphery of the rotary valve, said throat portion determining the at least one duct that is intended to put into communication the first combustion chamber and the at least one second combustion chamber adjacent to said first chamber, in an angular position of said rotary valve corresponding to an end of combustion in the first chamber prior to a discharge of the burnt gases and an end of filling of the second chamber prior to combustion, the rotary valve forming the obturator depending on its angular position.

2. The combustion module according to claim 1, wherein the combustion module has at least one group of combustion chambers arranged angularly in a regular manner around said axis, said group having at least one ignition circuit dedicated to said group that employs the at least one duct which are each arranged between two chambers of said group and which can inject burnt gases from a first of the two chambers into the second of the two chambers in order to trigger combustion in said second combustion chamber.

3. The combustion module according to claim 1, wherein the throat portion is formed in the periphery of the tubular element of the rotary exhaust valve.

4. The combustion module according to claim 1, wherein the combustion module has a common rotary element that has the rotary intake/exhaust valves connected to one another in rotation.

5. A turbine engine having a compressor module with at least one compressor, the combustion module according to claim 1, and a turbine module with at least one turbine, the compressor module being connected to the turbine module by a shaft, wherein the compressor module supplies the combustion module by means of a single intake duct and in that the combustion module supplies the turbine module by means of a single exhaust duct.

6. The turbine engine according to claim 5, wherein the combustion module has a common rotary element that has the rotary intake/exhaust valves connected to one another in rotation, and at least one shaft system forms a means for driving the common rotary element connecting the rotary intake/exhaust valves to one another in rotation.

7. The method for controlling the combustion module of the turbine engine according to claim 5, having at least one step of successive ignition of the first and the at least one second combustion chamber each of which operates successively in accordance with a cycle having:

a first phase during which the intake and exhaust ports are closed, with a first sub-phase of containment of a fresh combustible mixture then a second sub-phase of combustion of said combustible mixture in each corresponding chamber;

a second phase during which the intake port is closed and the exhaust port is open, to cause the burnt gases to be discharged from each corresponding chamber; then a third phase during which the intake and exhaust ports are open, to cause the burnt gases to be swept with fresh gases through each corresponding chamber;

wherein, during the step of successive ignition, the intake and the exhaust gas discharge of the first chamber and the at least one second chamber are dephased so that the first chamber can be subjected to the second sub-phase while the at least one second chamber is subjected to the first sub-phase, and wherein the step of successive ignition has a sub-step of control, taking place when the first chamber is subjected to the second sub-phase, during which the first chamber and the at least one second chamber are put into communication in order to trigger combustion in the at least one second chamber.

* * * * *